(12) United States Patent
Gao et al.

(10) Patent No.: US 11,167,267 B2
(45) Date of Patent: Nov. 9, 2021

(54) REMOVING AND CLEANING DEHYDROGENATION CATALYSTS

(71) Applicant: NOVA Chemicals (International) S.A., Fribourg (CH)

(72) Inventors: Xiaoliang Gao, Calgary (CA); Vasily Simanzhenkov, Calgary (CA); Shahin Goodarznia, Calgary (CA); Marie Barnes, Calgary (CA); David Sullivan, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 216 days.

(21) Appl. No.: 16/444,149

(22) Filed: Jun. 18, 2019

(65) Prior Publication Data
US 2019/0381483 A1 Dec. 19, 2019

(30) Foreign Application Priority Data

Jun. 18, 2018 (CA) .................................... 3008612

(51) Int. Cl.
| | | |
|---|---|---|
| *B01J 23/28* | (2006.01) | |
| *B01J 23/22* | (2006.01) | |
| *B01J 23/882* | (2006.01) | |
| *B01J 23/883* | (2006.01) | |
| *B01J 23/885* | (2006.01) | |
| *B01J 23/887* | (2006.01) | |
| *B01J 23/881* | (2006.01) | |
| *B01J 23/00* | (2006.01) | |
| *B01J 8/00* | (2006.01) | |
| *B01J 8/06* | (2006.01) | |

(52) U.S. Cl.
CPC ............ *B01J 23/28* (2013.01); *B01J 8/0015* (2013.01); *B01J 8/06* (2013.01); *B01J 23/002* (2013.01); *B01J 23/22* (2013.01); *B01J 23/881* (2013.01); *B01J 23/882* (2013.01); *B01J 23/883* (2013.01); *B01J 23/885* (2013.01); *B01J 23/8874* (2013.01); *B01J 23/8876* (2013.01); *B01J 23/8878* (2013.01); *B01J 2208/06* (2013.01)

(58) Field of Classification Search
CPC ... B01J 23/28; B01J 8/0015; B01J 8/06; B01J 23/002; B01J 23/22; B01J 23/881; B01J 23/882; B01J 23/883; B01J 23/885; B01J 23/8874; B01J 23/8876; B01J 23/8878; B01J 2208/06
USPC ........ 502/215, 305, 306, 311–313, 317–322, 502/515–516; 422/7, 12, 180; 216/83, 216/100; 134/3, 13, 22.11, 41
See application file for complete search history.

(56) References Cited

U.S. PATENT DOCUMENTS

| | | | | |
|---|---|---|---|---|
| 2,380,731 A | * | 7/1945 | Herman ................... | B01J 21/20 502/28 |
| 3,791,989 A | * | 2/1974 | Mitchell .................. | B01J 38/62 502/28 |
| 4,089,806 A | * | 5/1978 | Farrell ..................... | B01J 38/62 502/26 |
| 4,122,000 A | * | 10/1978 | Farrell .................... | C10G 45/04 208/210 |
| 4,485,183 A | * | 11/1984 | Miller ...................... | B01J 23/94 208/216 R |
| 4,522,928 A | * | 6/1985 | McVicker ................ | B01J 21/20 208/140 |
| 4,615,991 A | * | 10/1986 | Obayashi ........... | B01D 53/8625 423/239.1 |
| 7,319,179 B2 | | 1/2008 | Nieto et al. | |
| 8,221,640 B2 | | 7/2012 | Magnaldo | |
| 2002/0183198 A1 | * | 12/2002 | Gaffney ................ | C07C 253/24 502/215 |
| 2010/0255986 A1 | * | 10/2010 | Gaffney ............... | B01J 37/0036 502/312 |
| 2017/0210685 A1 | | 7/2017 | Simanzhenkov et al. | |
| 2019/0291080 A1 | * | 9/2019 | Simanzhenkov ...... | B01J 23/002 |

FOREIGN PATENT DOCUMENTS

WO    WO 2019/243929    * 12/2019    ............... B01J 8/00

* cited by examiner

*Primary Examiner* — Patricia L. Hailey
(74) *Attorney, Agent, or Firm* — Fish & Richardson P.C.

(57) ABSTRACT

Oxidative dehydrogenation catalysts including mixed oxides of Mo, V, Nb, Te, and optionally a promoter may be dissolved in aqueous solutions of oxalic acid. This permits the removal of catalyst and catalyst residues from reactors for the oxidative dehydrogenation of paraffins and particularly ethane.

14 Claims, 4 Drawing Sheets

REMOVING AND CLEANING DEHYDROGENATION CATALYSTS

TECHNICAL FIELD

This application claims the benefit of the earlier filing date of Canadian application serial number 3008612 filed on Jun. 18, 2019. The contents of Canadian application serial number 3008612 are incorporated herein by reference in their entirety.

TECHNICAL FIELD

The present disclosure relates to removing mixed oxide catalysts used to dehydrogenate one or more $C_{2-4}$ paraffins to corresponding alkenes from one or more reactors and connected piping.

BACKGROUND

There is increasing interest in the oxidative dehydrogenation of one or more $C_{2-4}$ paraffins to corresponding alkenes and derivatives such as acetic acid, vinyl acetates and acrylate esters. There is very little art relating to removing catalyst or residues from reactors and interconnected piping. Removal of catalysts and residues tends to involve physical treatment of the reactors and piping and result in the formation of catalyst dust which may be harmful.

U.S. Pat. No. 8,221,640 issued Jul. 17, 2012 to Magnaldo assigned to Commissariat a L'Energie Atomic; Compagnie General des Matiers Nuclealres teaches a method to remove build-up of solids deposited in the pipes of nuclear reactors using a mixture of nitric acid and polycarboxylic acids such as oxalic acid. The reference does not suggest using oxalic acid alone to solubilize such deposits, nor does it refer to oxidative dehydrogenation catalysts for preparing olefins.

There are a number of references which disclose the formation of multi component metal oxide catalysts, such as Lopes-Nieto (U.S. Pat. No. 7,319,179 now lapsed) and Simanzhenkov (US 20170210685). These methods typically include forming solutions of the components and subjecting them to a hydrothermal process and drying the pre-catalyst and then subjecting it to oxidation. For example, the catalyst may be prepared by mixing aqueous solutions of soluble metal compounds such as hydroxides, sulphates, nitrates, halides, lower ($C_{1-5}$) mono or di carboxylic acids and ammonium salts or the metal acid per se. For instance, the catalyst could be prepared by blending solutions such as ammonium metavanadate, niobium oxalate, ammonium molybdate, telluric acid, etc. The resulting solution is then dried typically in air at 100 to 150° C. and calcined in a flow of inert gas such as those selected from the group consisting of $N_2$, He, Ar, Ne and mixtures thereof at 200 to 600° C., preferably at 300 to 500° C. The calcining step may take from 1 to 20, typically from 5 to 15 usually about 10 hours. The resulting oxide is a friable solid typically insoluble in water.

It is surprising in view of the above procedures and particularly the drying and oxidation step that the catalyst could be dissolved simply with the use of oxalic acid. Further it was unexpected that alumina support would be dispersed by the oxalic acid.

SUMMARY

The present disclosure provides a method to remove from one or more vessels and associated piping a bed of a catalyst selected from the group consisting of:

i) catalysts including $Mo_{0.9-1.10}V_{0.1-1}Nb_{0.1-0.2}Te_{0.01-0.17}X_{0-2}O_d$ where X is selected from Pd, Sb Ba, Al, W, Ga, Bi, Sn, Cu, Ti, Fe, Co, Ni, Cr, Zr, Pt, Ca, and oxides and mixtures thereof, and d is a number to satisfy the valence of the catalyst; and ii) catalysts of the formula $Mo_aV_bNb_cTe_eO_d$, wherein a is from 0.75 to 1.25, preferably from 0.90 to 1.10; b is from 0.1 to 0.5, preferably from 0.25 to 0.4; c is from 0 to 0.5, preferably from 0.1 to 0.35; e is from 0 to 0.35 preferably from 0.1 to 0.3, and d is a number to satisfy the valence state of the mixed oxide catalyst, optionally on an alumina support typically including alumina in the form of $Al_2O_3$ or $Al(O)OH$ or combination thereof including contacting the catalyst with from 10 to 100 mL of not less than a 0.5 molar solution typically not less than 1 M up to the solubility limit of oxalic acid in an aqueous solution at the temperature of treatment per g of catalyst at a temperature from 20° C. up to the boiling temperature of a saturated solution, such as greater than 60° C. or greater than 80° C., for a period of time for at least 1 hour and in some cases 20 or more hours.

The treatment can be carried out using agitation (e.g., cyclic pumping of the solution through reactor tubes).

In a further embodiment, there is provided the above method wherein the catalyst includes:

$$Mo_{0.9-1.1}V_{0.12-0.49}Nb_{0.1-0.17}Te_{0.1-0.17}X_{0-2}O_d \quad (2)$$

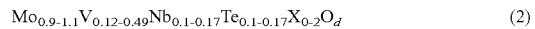

wherein d is a number to satisfy the valence of the catalyst.

In a further embodiment, there is provided any of the above embodiments wherein the catalyst includes:

$$Mo_{0.9-1.1}V_{0.32-0.49}Nb_{0.14-0.17}Te_{0.10-0.17}X_{0-2}O_d \quad (3)$$

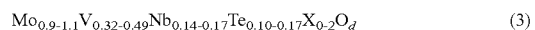

wherein d is a number to satisfy the valence of the catalyst.

In a further embodiment, there is provided any of the above embodiments wherein the catalyst includes:

$$Mo_{0.9-1.1}V_{0.25-0.45}Nb_{0.13-0.16}Te_{0.1-0.16}X_{0-2}O_d \quad (4)$$

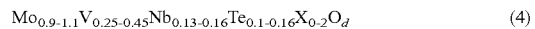

wherein d is a number to satisfy the valence of the catalyst.

In a further embodiment, there is provided any of the above embodiments wherein the catalyst includes:

$$Mo_{0.9-1.1}V_{0.25-0.35}Nb_{0.13-0.16}Te_{0.1-0.16}X_{0-2}O_d \quad (5)$$

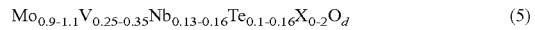

wherein d is a number to satisfy the valence of the catalyst.

In a further embodiment, there is provided any of the above embodiments wherein the catalyst includes:

$$Mo_{0.9-1.1}V_{0.12-0.19}Nb_{0.19-0.20}Te_{0.06-0.07}X_{0-2}O_d$$

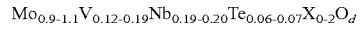

wherein d is a number to satisfy the valence of the catalyst.

In a further embodiment, there is provided any of the above embodiments wherein the catalyst forms fouling on the piping associated with the reactor.

In a further embodiment, there is provided any of the above embodiments wherein the piping is steel or stainless steel.

In a further embodiment, there is provided any of the above embodiments wherein the catalyst is a bed in one or more reactors.

In a further embodiment, there is provided any of the above embodiments wherein the catalyst is supported on alumina.

In a further embodiment, valuable metals including Pd, Pt, and Au are separated from the solution of catalyst and optional support by one or more suitable means including filtration, precipitation, and floatation.

DETAILED DESCRIPTION

Numbers Ranges

Figure 1:
FIG. 1 is a photo of catalyst sample prior to the addition of the oxalic acid.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the properties that the present disclosure desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, the amounts of the components actually used will conform to the maximum of 100 percent.

As used in this specification "vessels" means, vessels or reactors including metallic components (e.g., walls and or agitators etc.) and associated piping, which may be used in the manufacture of mixed oxide oxidative dehydrogenation catalysts as described below or in the oxidative dehydrogenation of alkanes to olefins, including vessels having one or more metallic components used for holding, mixing, hydrothermal treatment, peroxide treatment, and extrusion of such catalysts.

The catalyst may include a mixture of metal oxides having a composition: $Mo_1V_{0.1-1}Nb_{0.0-1}Te_{0.0-0.2}X_{0-2}O_d$ where X is selected from Pd, Sb Ba, Al, W, Ga, Bi, Sn, Cu, Ti, Fe, Co, Ni, Cr, Zr, Ca, and oxides and mixtures thereof, and d is a number to satisfy the valence of the catalyst.

In a further embodiment, the catalyst includes catalysts of the formula $$Mo_aV_bNb_cTe_eO_d$$

wherein: a is from 0.75 to 1.25, such as from 0.90 to 1.10; b is from 0.1 to 0.5, such as from 0.25 to 0.4; c is from 0.1 to 0.5, such as from 0.1 to 0.35; e is from 0.1 to 0.35 such as from 0.1 to 0.3; and d is a number to satisfy the valence state of the mixed oxide catalyst.

The catalyst may have the formula:

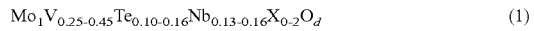

$$Mo_1V_{0.25-0.45}Te_{0.10-0.16}Nb_{0.13-0.16}X_{0-2}O_d \quad (1)$$

wherein d is a number to satisfy the valence of the catalyst.

In a further embodiment, the catalyst may have the formula:

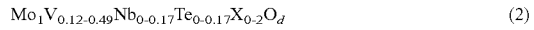

$$Mo_1V_{0.12-0.49}Nb_{0-0.17}Te_{0-0.17}X_{0-2}O_d \quad (2)$$

wherein d is a number to satisfy the valence of the catalyst.

In a further embodiment, the catalyst may have the formula:

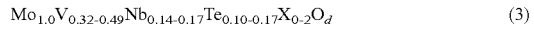

$$Mo_{1.0}V_{0.32-0.49}Nb_{0.14-0.17}Te_{0.10-0.17}X_{0-2}O_d \quad (3)$$

wherein d is a number to satisfy the valence of the catalyst.

In a further embodiment, the catalyst may have the formula:

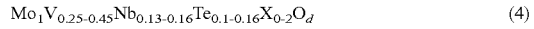

$$Mo_1V_{0.25-0.45}Nb_{0.13-0.16}Te_{0.1-0.16}X_{0-2}O_d \quad (4)$$

wherein d is a number to satisfy the valence of the catalyst.

In a further embodiment the catalyst, may have the formula:

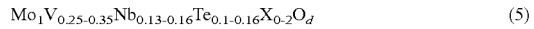

$$Mo_1V_{0.25-0.35}Nb_{0.13-0.16}Te_{0.1-0.16}X_{0-2}O_d \quad (5)$$

wherein d is a number to satisfy the valence of the catalyst.

In a further embodiment, the catalyst may have the formula:

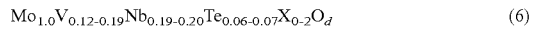

$$Mo_{1.0}V_{0.12-0.19}Nb_{0.19-0.20}Te_{0.06-0.07}X_{0-2}O_d \quad (6)$$

wherein d is a number to satisfy the valence of the catalyst.

In the catalysts of formula (1) element X may be present in an amount from 0 up to 2 atoms per atom of Mo; in some embodiments, from 0 up to 1 atoms per atom of Mo; in some embodiments, from 0.001 to 1 atom per atom of Mo; in further embodiments, from 0.001 to 0.5 atoms per atom of Mo; in further embodiments, from 0.001 to 0.01 atoms per atom of Mo.

The methods of preparing the catalysts are known to those skilled in the art.

For example, the catalyst may be prepared by mixing aqueous solutions of soluble metal compounds such as hydroxides, sulphates, nitrates, halides, salts of lower ($C_{1-5}$) mono- or di-carboxylic acids and ammonium salts or the metal acid per se. For instance, the catalyst can be prepared by blending solutions such as ammonium metavanadate, niobium oxalate, ammonium molybdate, telluric acid etc. and, in some embodiments, subjecting the resulting solution to a hydrothermal process under an inert atmosphere and heating to a temperature from 140° C. to 190° C., in some embodiments from 140° C. to 180° C., in some embodiments from 145° C. to 175° C. for not less than 6 hours, in some instances not less than 12 hours, in some embodiments up to 30 hours, or more.

The pressure in the reactor (Parr reactor or autoclave) may range from 1 to 200 psig (6.89 kPag to 1375 kPag).

In some embodiments, the pressure in the pressurized reactor is adjusted and maintained from 30 to 200 psig (206 kPag to 1375 kPag), in some embodiments from 55 psig (380 kPag) to 170 psig (1170 kPag) above atmospheric pressure.

In further embodiments, the pressure in the reactor (autoclave) may be up to about 10 psig (68.9 kPag), preferably from 1 to 8 psig (6.89 kPag to 55.1 kPag), in some embodiments less than 5 psig (34.4 kPag) above atmospheric pressure.

The pressures in the reactor are maintained using a pressure relief valve. At lower pressures, the pressure may be maintained by passing the off gas through a column of a fluid such as water or a dense fluid (e.g., mercury). Optionally, there may be a condenser upstream of the reactor outlet. If present, the condenser is operated at a temperature above 0° C. and below reaction temperature. Gaseous product species are vented from the reactor as described above.

In some embodiments, the solution for the hydrothermal treatment (catalyst precursor) may include small amounts of $H_2O_2$ from 0.3-2.5 mL of a 30 wt. % solution of aqueous $H_2O_2$ per gram of catalyst precursor.

The resulting solution is then dried typically in air at 100-150° C. and calcined in a flow of inert gas such as those selected from the group consisting of $N_2$, He, Ar, Ne, and mixtures thereof at 200-600° C., preferably at 300-500° C. The calcining step may take from 1 to 20 hours, from 5 to 15 hours, or about 10 hours. The resulting oxide is a friable solid, typically insoluble in water.

In some embodiments, the product from the hydrothermal treatment is treated with from 0.3-2.5 mL of a 30 wt. % solution of aqueous $H_2O_2$ per gram of catalyst precursor. In some embodiments, there may be a double peroxide treatment in the hydrothermal process and subsequent to drying the catalyst. The dried catalyst is then deposited on an alumina support using conventional methods such as a wet impregnation method or spray drying and the like. In a further embodiment, from 10 to 95 wt. %, from 25 to 80 wt. %, or from 30 to 45 wt. % of the catalyst is bound or agglomerated with from 5 to 90 wt. %, from 20 to 75 wt. %, from 55 to 70 wt. % of a binder selected from the group consisting of acidic, basic or neutral binder slurries of $Al_2O_3$, and AlO(OH), and mixtures thereof.

The catalyst can be loaded into one or more reactors in series or parallel. The reactors maybe be fixed or fluidized bed reactors, in some cases similar to FCC type crackers. In some embodiments, the reactor may be a tube shell type reactor with the catalyst loaded into the tube and tube plates above and below the tubes to permit reactants to flow through the catalyst bed.

The catalyst may be used for the oxidative dehydrogenation (ODH) of a mixed feed including ethane and oxygen in a volume ratio from 70:30 to 95:5 and optionally one or more $C_{3-6}$ alkanes or alkenes and optionally a further oxygenated species including CO and $CO_2$ at a temperature less than 385° C., a gas hourly space velocity of not less than 100 $hr^{-1}$, and a pressure from 0.8 to 7 atmospheres including passing the mixture through the above catalyst. The ODH process can have a selectivity to ethylene of not less than 90%. The gas hourly space velocity of the ODH process is not less than 500 $hr^{-1}$, not less than 1500 $hr^{-1}$, such as 3000 $hr^{-1}$. The temperature of the ODH process can be less than 415° C., less than 375° C., or less than 360° C.

Depending on the reaction conditions, the product stream can include ethylene, water, and one or more of carbon dioxide, carbon monoxide, carbonic acid and acetic acid. The product stream, and particularly water, carbonic acid and acetic acid may leach one or more components from the catalyst or support. Depending on the duration of the reaction this can result in dissolution of the catalyst or its components and the dissolution of the support and deposition of the components or support and salts thereof such as carbonates and acetates on the walls of the reactor, and potentially among catalyst particles. This can result in reduced operating efficiency of the reactor system (e.g., reactors and associated piping). This may result in costly down time to clean the catalyst beds, (particularly in tube and shell type reactors) and the associated piping.

It has been found that the catalyst, support ($Al_2O_3$, and AlO(OH)), and associated bi-products (e.g. salts etc.) can be removed from the catalyst beds and associated piping by dissolving or contacting them with from 10 to 100 mL of a up to the boiling temperature of a saturated solution of not less than 0.5 of oxalic per 1 to 5 g of catalyst and associated bi-products at a temperature from 20° C. to up to the boiling temperature of a saturated solution preferably greater than 60° C., such as greater than 80° C., for a period of time for at least 1 hour in some cases 20 or more hours.

The amount of catalyst, support, and associated catalyst and support biproducts in the solution of oxalic acid may be determined by a number of conventional means such as analysis of the solution (e.g., FTIR, etc).

The solution of the catalyst, support, and biproducts may be subject first to filtration to remove particulates such as catalyst support, and then the solution may be dried or substantially dried to recover the metal components of the catalyst. If the solution contains valuable metals such as Pd, Pt, and Au, they may be separated by suitable means including filtration, precipitation, floatation etc. The solution of catalyst components may be used as a starter to begin a new hydrothermal treatment. Further, the solution can be analyzed for metallic components and can be adjusted the composition to that require for a hydro thermal treatment and potentially regenerate the catalyst.

The present disclosure further provides a method to remove from one or more reactors and associated piping a catalyst selected from the group consisting of:

i) a catalyst including $Mo_{0.9-1.1}V_{0.1-1}Nb_{0.1-1}Te_{0.01-0.2}X_{0-2}O_d$ where X is selected from Pd, Sb Ba, Al, W, Ga, Bi, Sn, Cu, Ti, Fe, Co, Ni, Cr, Zr, Pt, Ca and oxides and mixtures thereof, and d is a number to satisfy the valence of the catalyst; and ii) a catalyst of the formula

wherein a is from 0.75 to 1.25; b is from 0.1 to 0.5; c is from 0 to 0.5; e is from 0 to 0.35; and d is a number to satisfy the valence state of the mixed oxide catalyst, wherein the catalyst is optionally on an alumina support, the method includes contacting the catalyst with from 10 to 100 mL of not less than 0.5 molar solution of an oxalic acid per 1 to 5 g of catalyst at a temperature from 20° C. to 100° C. for a period of time of not less than 1 hour.

In a further embodiment, there is provided a method according to one or more other embodiments, wherein the treatment is carried out using agitation including cyclic pumping of the solution through reactor tubes.

In a further embodiment, there is provided a method according to one or more other embodiments, wherein the catalyst and optional support forms fouling on the piping associated with the reactor.

In a further embodiment, there is provided a method according to one or more other embodiments, wherein the piping is steel or stainless steel.

In a further embodiment, there is provided a method according to one or more other embodiments wherein the catalyst is a bed in one or more reactors.

In a further embodiment, there is provided a method according to one or more other embodiments, wherein the catalyst is supported on alumina (Al(O)OH).

In a further embodiment, there is provided a method according one or more other embodiments, wherein valuable metals including Pd, Pt and Au are separated from the solution of catalyst and optional support by one or more suitable means including filtration, precipitation, and floatation.

In a further embodiment, there is provided a method according to one or more other embodiments, wherein the catalyst has the formula:

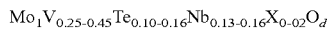
$$Mo_1V_{0.25-0.45}Te_{0.10-0.16}Nb_{0.13-0.16}X_{0-02}O_d$$

wherein d is a number to satisfy the valence of the catalyst.

In a further embodiment, there is provided a method according to one or more other embodiments, wherein the catalyst has the formula:

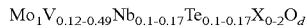
$$Mo_1V_{0.12-0.49}Nb_{0.1-0.17}Te_{0.1-0.17}X_{0-2}O_d$$

wherein d is a number to satisfy the valence of the catalyst.

In a further embodiment, there is provided a method according to one or more other embodiments, wherein the catalyst has the formula:

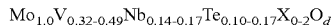
$$Mo_{1.0}V_{0.32-0.49}Nb_{0.14-0.17}Te_{0.10-0.17}X_{0-2}O_d$$

wherein d is a number to satisfy the valence of the catalyst.

In a further embodiment, there is provided a method according to one or more other embodiments, wherein the catalyst has the formula:

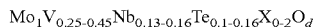
$$Mo_1V_{0.25-0.45}Nb_{0.13-0.16}Te_{0.1-0.16}X_{0-2}O_d$$

wherein d is a number to satisfy the valence of the catalyst.

In a further embodiment, there is provided a method according to one or more other embodiments, wherein the catalyst has the formula:

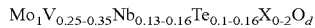
$$Mo_1V_{0.25-0.35}Nb_{0.13-0.16}Te_{0.1-0.16}X_{0-2}O_d$$

wherein d is a number to satisfy the valence of the catalyst.

In a further embodiment, there is provided a method according to one or more other embodiments, wherein the catalyst has the formula

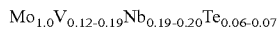
$$Mo_{1.0}V_{0.12-0.19}Nb_{0.19-0.20}Te_{0.06-0.07}$$

wherein d is a number to satisfy the valence of the catalyst.

In a further embodiment, there is provided a method according to one or more other embodiments, wherein X may be present in an amount from 0 up to 1 atoms per atom of Mo.

In a further embodiment, there is provided a method according to one or more other embodiments, wherein X may be present in an amount from 0.001 to 1 atoms per atom of Mo.

The present disclosure will now be illustrated by the following examples.

EXAMPLE 1

Figure 2:
FIG. 2 is a photo of the solubilized catalyst and the dispersed support.

Ten grams of oxalic acid was dissolved in 100 mL of distilled water. This mixture was heated to 80° C. in a hot water bath for 30 minutes. To this clear, colorless solution was charged 1.0 g of extruded catalyst of the formula $Mo_1V_{0.43}Te_{0.17}Nb_{0.16}O_d$ supported on alumina (Al(O)OH) (catalyst FIG. 1). The mixture was left to sit unstirred in the 80° C. water bath for 30 minutes. After which 98% of the catalyst was dissolved. After 1 h in the 80° C. water bath the catalyst was completely dissolved. The alumina from the extruded catalyst remained undissolved (FIG. 2).

EXAMPLE 2

Thirty grams of oxalic acid was dissolved in 300 mL of distilled water. This mixture was heated to 80° C. in a hot water bath for 30 minutes. To this colourless solution was charged 3.0 g of extruded catalyst of the formula with alumina. The mixture was left stirring at 600 rpm in the 80° C. water bath for overnight. After which the catalyst and alumina (Al(O)OH) was completely dissolved. A clear, blue solution was formed.

EXAMPLE 3

Figure 3:
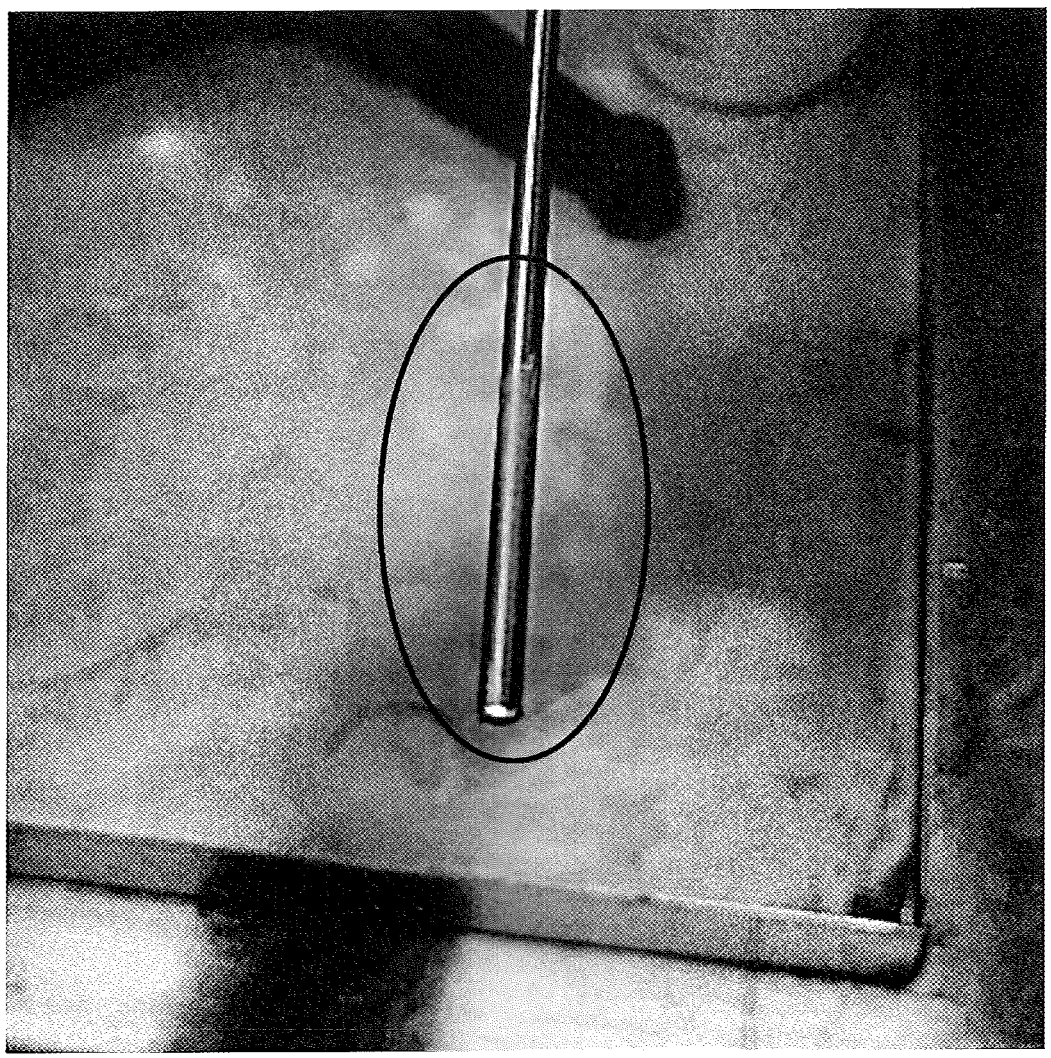
FIG. 3 is a photo of a stainless steel rod contaminated with catalyst (see circle in FIG. 3).
Figure 4:
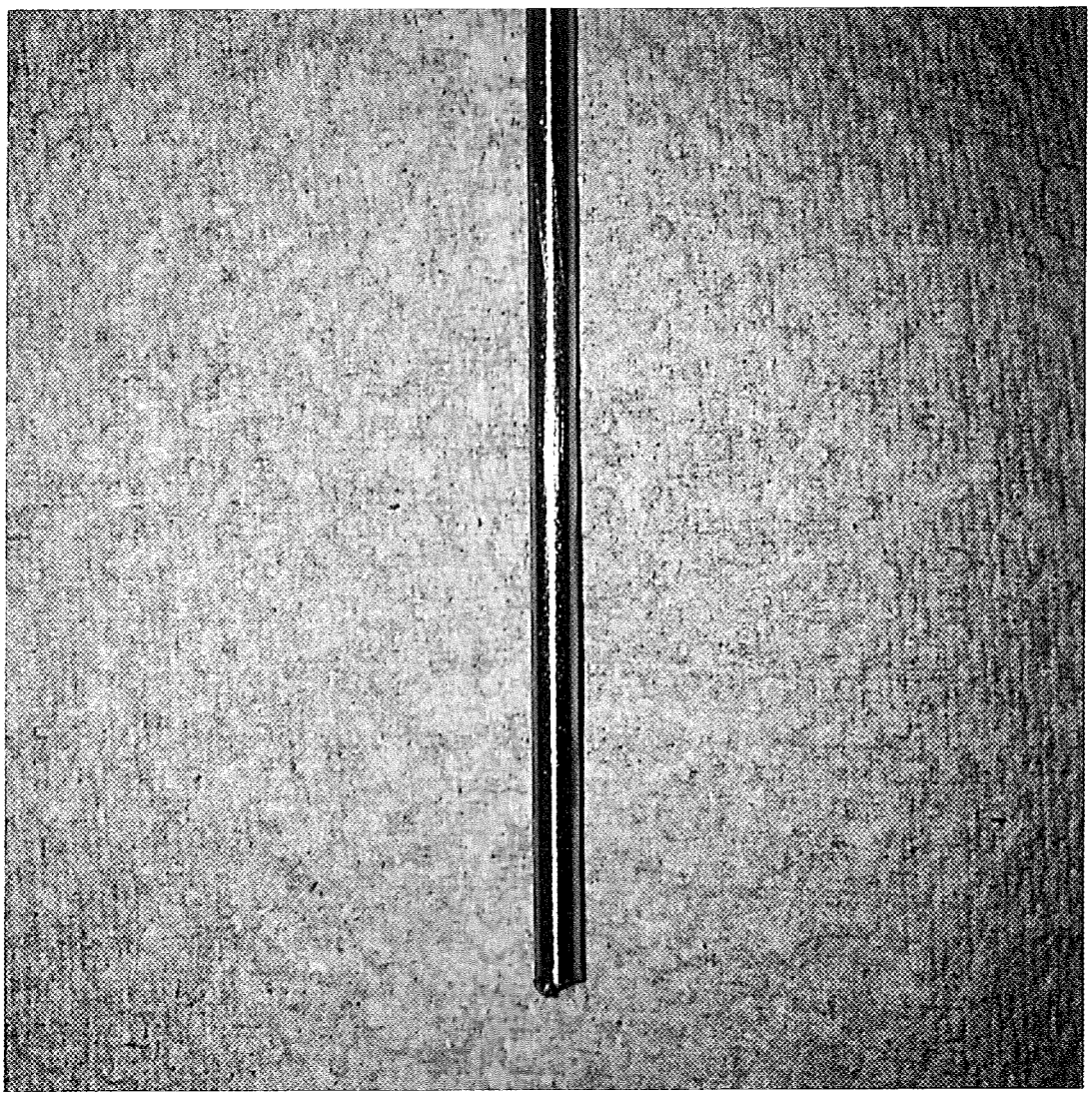
FIG. 4 is a close-up photo of a stainless steel rod of FIG. 3 cleaned of catalyst by treatment with oxalic acid.

The 1/8" stainless steel 316 tube contaminated with catalyst residue (FIG. 3) was submerged approximately 1.5 cm below the surface of a mixture of 3.0 g catalyst of the formula $Mo_1V_{0.43}Te_{0.17}Nb_{0.16}O_d$, 30 g oxalic acid mixture, in 300 mL of distilled water, in an 80° C. oil bath for 24 h. After 24 h no visible signs of corrosion or etching of the stainless steel was visible (FIG. 4).

The above examples show that mixed oxide catalysts comprising $Mo_1V_{0.43}Te_{0.17}Nb_{0.16}O_d$ are soluble in aqueous solutions of oxalic acid and that such solutions do not etch or attack stainless steel.

What is claimed is:

1. A method to remove from one or more vessels and associated piping a catalyst selected from the group consisting of:

i) catalysts comprising

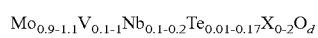
$$Mo_{0.9-1.1}V_{0.1-1}Nb_{0.1-0.2}Te_{0.01-0.17}X_{0-2}O_d$$

wherein:
X is selected from Pd, Sb, Ba, Al, W, Ga, Bi, Sn, Cu, Ti, Fe, Co, Ni, Cr, Zr, Pt, and Ca,
and d is a number to satisfy the valence of the catalyst; and ii) catalysts of the formula

$$Mo_aV_bNb_cTe_eO_d$$

wherein:
a is from 0.75 to 1.25;
b is from 0.1 to 0.5;
c is from 0 to 0.5;
e is from 0 to 0.35; and
d is a number to satisfy the valence state of the catalyst
wherein the catalyst is supported on an alumina support;
the method comprising contacting the catalyst with from 10 to 100 ml of a not less than 0.5 molar solution of oxalic acid per 1 to 5 g of catalyst at a temperature from 20° C. to 100° C. for a period of time of not less than 1 hour, wherein contacting the catalyst dissolves the catalyst in the solution of oxalic acid.

2. The method according to claim 1, wherein the method further comprises using agitation including cyclic pumping of the solution through a reactor tube.

3. The method according to claim 1, wherein the catalyst and support form fouling on the one or more vessels and associated piping.

4. The method according to claim 3, wherein the piping is steel or stainless steel.

5. The method according to claim 4, wherein the catalyst is a bed in one or more reactors.

6. The method according to claim 1, wherein at least one valuable metal selected from Pd and Pt is separated from the solution of catalyst and optional support by one or more suitable means selected from filtration, precipitation, and floatation.

7. The method according to claim 1, wherein the catalyst has the formula:

$$Mo_1V_{0.25-0.45}Te_{0.10-0.16}Nb_{0.13-0.16}X_{0-02}O_d$$

wherein d is a number to satisfy the valence of the catalyst.

8. The method according to claim 1, wherein the catalyst has the formula:

$$Mo_1V_{0.12-0.49}Nb_{0.1-0.17}Te_{0.01-0.17}X_{0-2}O_d$$

wherein d is a number to satisfy the valence of the catalyst.

9. The method according to claim 1, wherein the catalyst has the formula:

$$Mo_{1.0}V_{0.32-0.49}Nb_{0.14-0.17}Te_{0.10-0.17}X_{0-2}O_d$$

wherein d is a number to satisfy the valence of the catalyst.

10. The method according to claim 1, wherein the catalyst has the formula:

$$Mo_1V_{0.25-0.45}Nb_{0.13-0.16}Te_{0.1-0.16}X_{0-2}O_d$$

wherein d is a number to satisfy the valence of the catalyst.

11. The method according to claim 1, wherein the catalyst has the formula $$Mo_1V_{0.25-0.35}Nb_{0.13-0.16}Te_{0.1-0.16}X_{0-2}O_d$$

wherein d is a number to satisfy the valence of the catalyst.

12. The method according to claim 1, wherein the catalyst has the formula $$Mo_{1.0}V_{0.12-0.19}Nb_{0.19-0.20}Te_{0.06-0.07}$$

wherein d is a number to satisfy the valence of the catalyst.

13. The method according to claim 1, wherein X is present in an amount from 0 up to 1 atoms per atom of Mo.

14. The method according to claim 1, wherein X is present in an amount from 0.001 to 1 atoms per atom of Mo.

* * * * *